(12) United States Patent  
Mayes et al.

(10) Patent No.: US 7,620,320 B2  
(45) Date of Patent: Nov. 17, 2009

(54) FIBRE SELECTIVE CONTROL SWITCH SYSTEM

(75) Inventors: Joseph E. Mayes, Johnstown, CO (US); Manfred VonLeiner, Littleton, CO (US)

(73) Assignee: LSI Corporation, Milpitas, CA (US)

(*) Notice: Subject to any disclaimer, the term of this patent is extended or adjusted under 35 U.S.C. 154(b) by 270 days.

(21) Appl. No.: 11/057,548

(22) Filed: Feb. 14, 2005

(65) Prior Publication Data

US 2006/0253744 A1 Nov. 9, 2006

(51) Int. Cl.
*H04J 14/00* (2006.01)

(52) U.S. Cl. .................. 398/45; 398/43; 398/49; 398/50; 398/111

(58) Field of Classification Search ............ 398/19, 398/170, 12, 45–64, 43, 111, 79, 53, 161; 359/320; 250/227.22; 372/34
See application file for complete search history.

(56) References Cited

U.S. PATENT DOCUMENTS

| | | | |
|---|---|---|---|
| 4,886,335 A * | 12/1989 | Yanagawa et al. | 385/16 |
| 5,251,001 A * | 10/1993 | Dave et al. | 356/73.1 |
| 5,410,150 A * | 4/1995 | Teron et al. | 250/227.22 |
| 5,706,118 A * | 1/1998 | Takano | 398/202 |
| 5,726,788 A * | 3/1998 | Fee et al. | 398/180 |
| 5,966,394 A * | 10/1999 | Spurr et al. | 372/34 |
| 7,215,891 B1 * | 5/2007 | Chiang et al. | 398/137 |
| 2002/0118425 A1 * | 8/2002 | Dove et al. | 359/189 |
| 2003/0026524 A1 * | 2/2003 | Kakizaki et al. | 385/16 |
| 2004/0135623 A1 * | 7/2004 | Bakker | 327/541 |
| 2005/0196168 A1 * | 9/2005 | Amemiya et al. | 398/45 |

* cited by examiner

*Primary Examiner*—Ken N Vanderpuye
*Assistant Examiner*—Hibret A Woldekidan
(74) *Attorney, Agent, or Firm*—Suiter Swantz pc llo

(57) ABSTRACT

The present invention is directed to a Fiber Selective Control Switch system for simulating human intervention during a test process for fiber network environments. The Fiber Selective Control Switch system may comprise a MCU, and at least one FSCS module mounted on a SFP device. The MCU is download programmable with basic code, which remotely controls FSCS modules. Each FSCS module coupled to the MCU may include two MOSFETs and a pull down resistor. A positive signal voltage from the MCU to the FSCS module mounted on SFP device will disconnect the fiber connection. A low signal voltage from the MCU to the FSCS module will re-connect the fiber connection. Advantageously, the FSCS system may not affect normal fiber operations due to fast switching characteristics of MOSFET devices and the MCU's low power requirement.

18 Claims, 3 Drawing Sheets

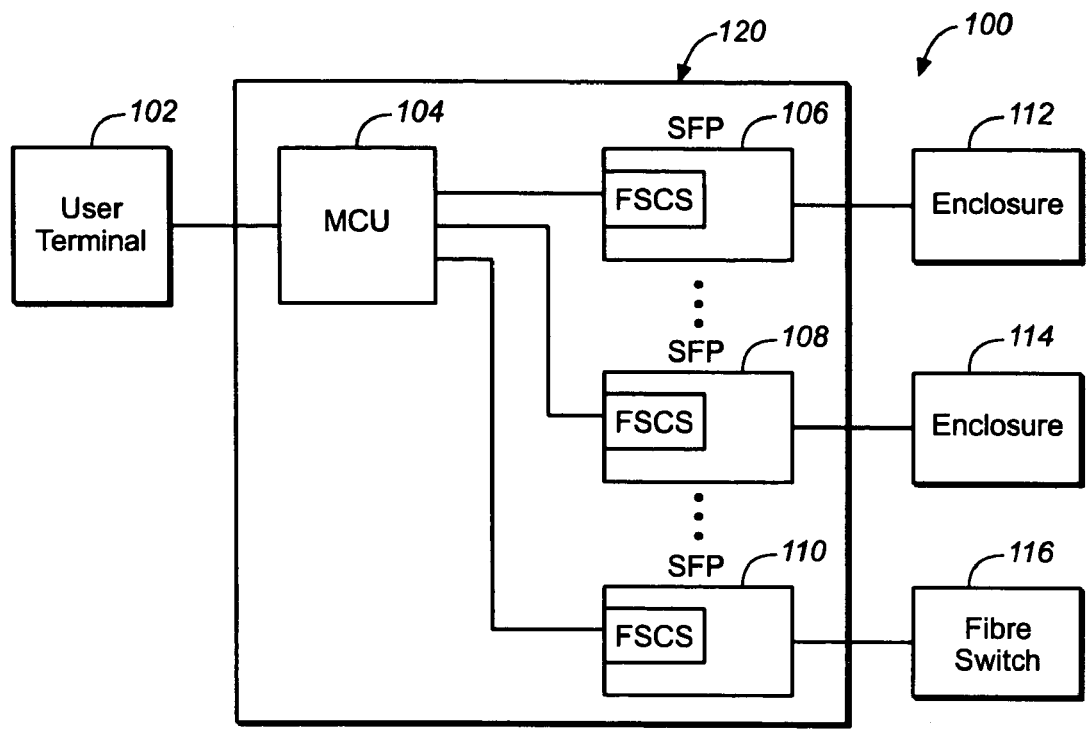
FIG._1
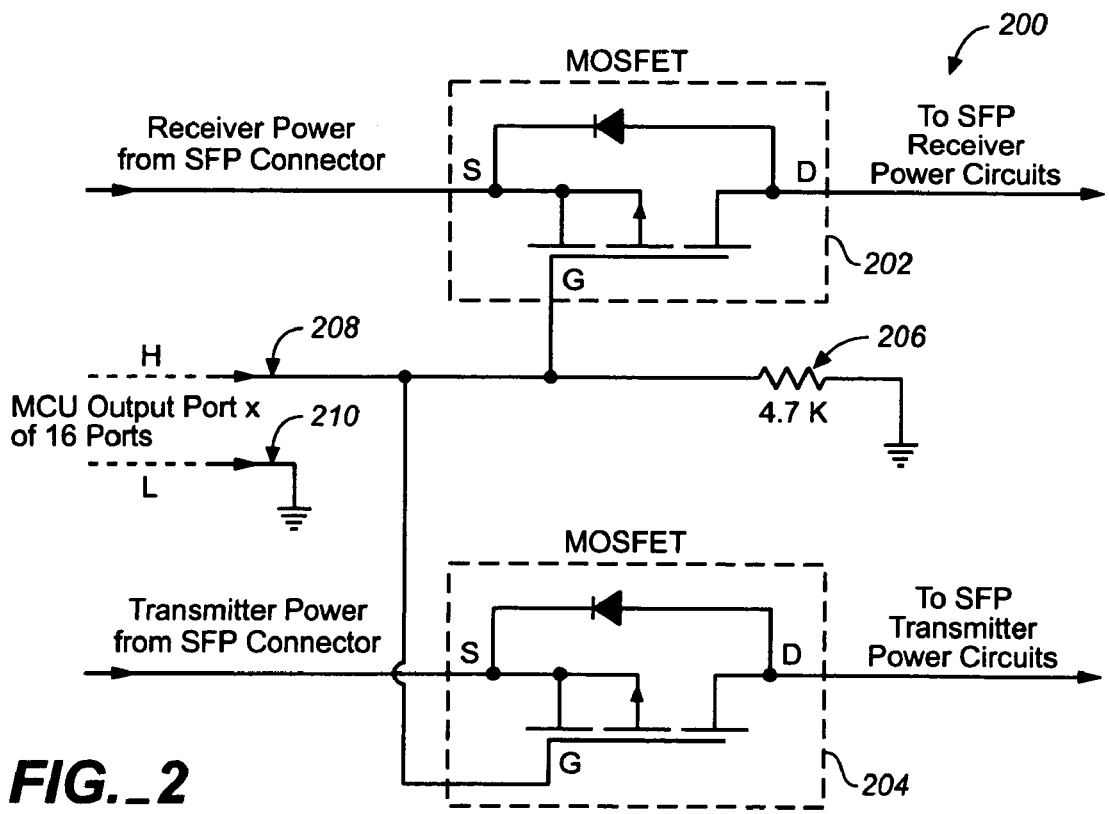
FIG._2

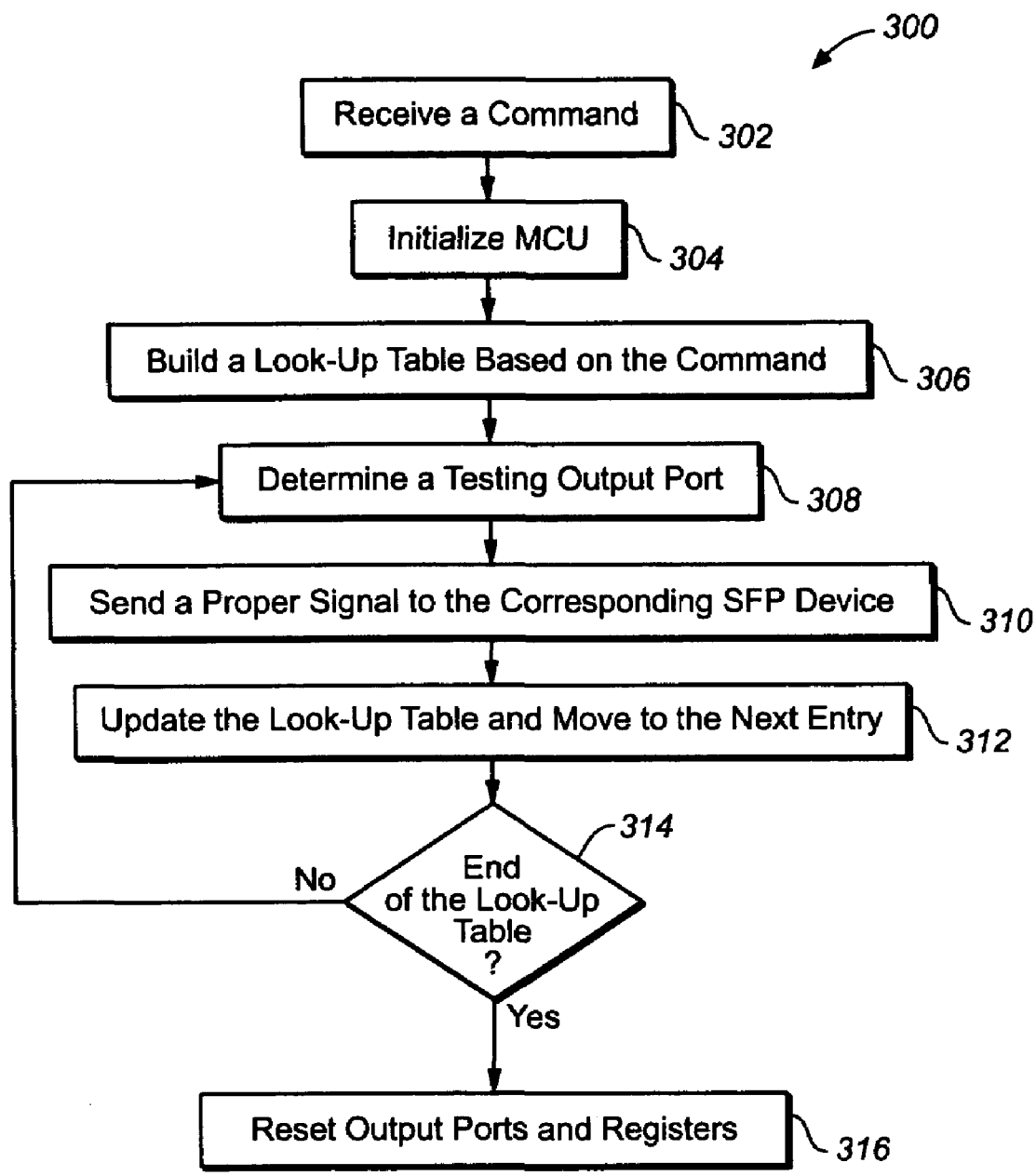
FIG._3

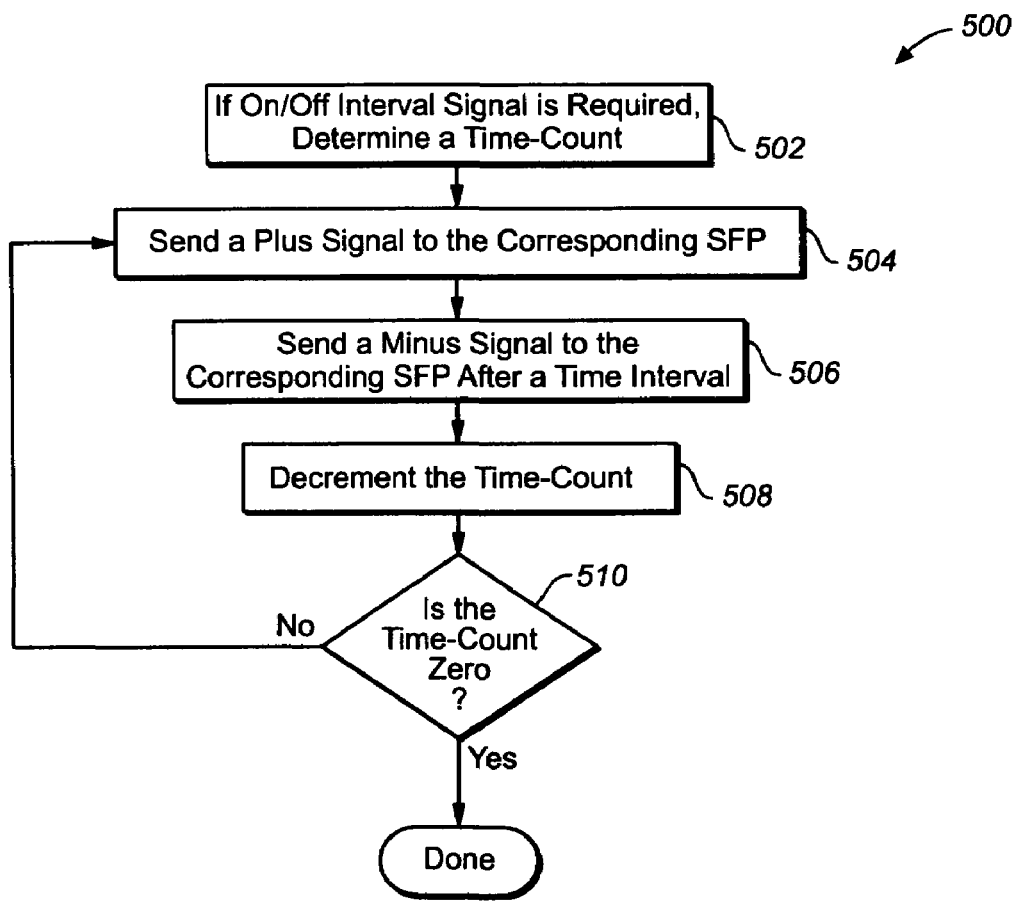
FIG._4
FIG._5

FIBRE SELECTIVE CONTROL SWITCH SYSTEM

FIELD OF THE INVENTION

The present invention generally relates to the field of a fibre network environment, and particularly to a system and method of testing fibre network environments.

BACKGROUND OF THE INVENTION

The Fibre Channel protocol communication standard has been developed to provide practical, inexpensive expendable means of transferring data between workstations, mainframes, storage devices and other peripheral devices. Thus, many Storage Areas Networks (SANs) include Fibre-Channel SANs utilizing the Fibre Channel protocol. In many development and test environments for Fibre-Channel SANs, manufacturers may be required to test the physical layer topology of complicated fabric test configurations. Some times, the test process requires human intervention, such as the act of the person physically pulling a fibre cable from an enclosure or a fibre switch and then re-inserting it during a specific test cycle. However, the test process requiring human physical interaction may be very time consuming and inefficient.

Therefore, it would be desirable to provide a device that simulates human intervention during the test process. It would be also desirable to provide a remotely controllable device.

SUMMARY OF THE INVENTION

Accordingly, the present invention provides a system and a method of simulating human intervention during a test process for fibre network environments.

In an aspect of the present invention, a Fibre Elective Control Switch (FSCS) system for simulating extraction and re-insertion of fibre cables from/to an enclosure or a fibre switch is provided. The FSCS system may comprise a microcontroller unit (MCU), and a plurality of FSCS modules coupled to the MCU. The MCU may be download programmable with basic code that controls the FSCS system. Each FSCS module may be comprised of two MOSFETs and a pull down resistor. The FSCS module may be mounted on a small form of pluggable (SFP) device. The SFP device may be coupled to one end of a fibre connection which the user desires to test. A positive signal voltage from the MCU to the SFP device including the FSCS module will disconnect the fibre connection simulating extraction of a fibre cable or an enclosure. A low signal voltage from the MCU to the SFP device will re-connect the fibre connection simulating re-insertion of a fibre cable or an enclosure.

In another aspect of the present invention, a method for simulating human intervention during a test procedure of fibre network environments is provided. The MCU may be communicatively coupled to a user terminal though a network or a serial bus. A MCU may receive a test command from a user. Then, a look-up table may be built for the test command. On power up, the MCU will hold output ports and set output registers low. Then, the MCU may assign each output pin to a corresponding output port. The output pin of the MCU may be communicatively coupled to a corresponding SFP device. Proper signals based on the test command may be sent to a SFP device through its corresponding output pin. The SFP device may disconnect or reconnect its fibre connection based on the signal provided from the MCU. The MCU may walk though the look-up table and perform the test command based on the look-up table. After the received test command is completed, the output ports and registers in the MCU may be reset. The MCU may resume other test commands from the user.

In an advantageous aspect of the present invention, the FSCS system may not affect normal fibre operations due to fast switching characteristics of MOSFETs and MCU's low power requirement. As such, Fiber communication may not be disrupted between the host and the device even if the FSCS system is accidentally disconnected.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of a block diagram of a FSCS system in accordance with an exemplary embodiment of the present invention;

FIG. 2 is an illustration of a schematic diagram of a FSCS module in FIG. 1 in accordance with an exemplary embodiment of the present invention;

FIG. 3 is an illustration of a flow diagram of a method for simulating human intervention in accordance with an exemplary embodiment of the present invention;

FIG. 4 is an illustration of an exemplary look-up table in accordance with an exemplary embodiment of the present invention; and FIG. 5 is an illustration of a flow diagram of a method of simulating a repeated extraction/insertion of a fibre cable in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

The present invention is directed to a Fibre Selective Control Switch (FSCS) system for simulating human's physical intervention during a test process for fibre network environments. The FSCS system may simulate extraction and re-insertion of fibre cables, enclosures, or the like in a fibre network system. The FSCS system may comprise a MCU and at least one FSCS module coupled to the MCU. The MCU may be download programmable with basic code that controls the FSCS system. Each FSCS module may be comprised of two MOSFETs and a pull down resistor. The FSCS module may be small enough to be mounted on a small form of pluggable (SFP) device. Thus, power for the FSCS module may be derived from SFP device's host connection. Advantageously, the FSCS system may not affect normal fibre operations due to fast switching characteristics of MOSFET devices and low power requirement for the MCU. Further, normal fibre communications may not be disrupted between the host and the device even if the FSCS system is accidentally disconnected.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring generally now to FIGS. 1 through 5, exemplary embodiments of the present invention are shown.

Referring now to FIG. 1, a block diagram 100 of a FSCS system in accordance with an exemplary embodiment of the present invention is shown. In an embodiment of the present invention, the FSCS system 120 may comprise a MCU 104 communicatively coupled to a user terminal though Ethernet, LAN or the like. It will be appreciated that the MCU is an off-the shelf device and its basic development package is well known to the art. The MCU 104 may be download-programmable with basic code. Thus, a user may be able to conduct a test remotely by sending test commands through RS232, Ethernet connection, or the like. Further, the MCU 104 may be programmable for continuous operation with error reporting features to the user.

The FSCS system may comprise several FSCS modules coupled to the MCU. In an embodiment of the present invention, up to 16 FSCS modules may be connected to one MCU. It will be appreciated that the number of FSCS modules which can be coupled to a MCU may be determined by the capacity of the MCU. The FSCS may be mounted on SFP device so as to behave as a switch for a fibre connection in the SFP device. It will be appreciated that the SFP device is well known to the art. Conventionally, the SFP device is utilized for a pluggable, hot-swappable optical interface for Fibre Channel, Gigabit Ethernet, and the like. In an embodiment of the present invention, a SFP device having a FSCS module may be coupled to one end of a fibre cable so that SFP device can disconnect and reconnect the fibre interface through the fibre cable. Power for the FSCS module may be derived from the SFP device on which the FSCS module is mounted.

Referring now to FIG. 2, an illustration of a schematic diagram 200 of a FSCS module is shown. Each FSCS module may be comprised of two MOSFETs 202, 204 and a pull down resistor 206. Those skilled in the art will appreciate that MOSFETs are generally utilized for high-speed switching applications and also on integrated circuits in computers. The MCU and each FSCS module are coupled through a two connections 208, 210. A positive signal voltage may be sent from the MCU to the FSCS module through connection 208. A low signal voltage may be sent from the MCU to the FSCS module through connection 210. Connection 210 may be a ground connection. The positive signal voltage received by the FSCS module mounted on SFP device will disconnect the fibre connection simulating extraction of a fibre cable, an enclosure, or the like. A low signal voltage received by the FSCS module will re-connect the fibre connection simulating re-insertion of a fibre cable, an enclosure, or the like.

Preferably, a P-channel MOSFET may be utilized in the FSCS module. The P-channel MOSFET may be normally in an "on" state because its pull down register is near ground level. Thus, the current in the FSCS module including P-channel MOSFETs may continue to flow from source to drain. This may provide a safety feature for the FSCS system since normal fibre communications may not be disrupted between a host and a device even if a FSCS module mounted on a SFP device is accidentally disconnected. The FSCS module may require only switching signal power which is derived from the SFP device.

In an embodiment of the present invention, a positive signal voltage from the MCU to a gate of the MOSFET may disconnect or shut off the corresponding SFP device. Thus, a positive signal voltage from the MCU to a gate of the MOSFET will simulate extraction of a fibre cable or an enclosure. A low signal voltage (reset signal) from the MCU to a gate of the MOSFET may simulate a re-insertion of the extracted fibre cable or an enclosure.

Referring now to FIG. 3, an illustration of a flow diagram 300 of a method implemented in accordance with the present invention is shown. In an embodiment of the present invention, a user may send test commands from a terminal communicatively coupled to a MCU in the FSCS system. At step 302, the MCU may receive a test command from a user. At step 304, the MCU may be initialized for the test command. On power up, the MCU may hold output ports and set output registers low. Then, the MCU may assign each output pin to a corresponding output port. A look-up table may be built for the test command at step 306. It will be appreciated that there are various ways to build a look-up table. For example, the look-up table may include an entry for each output port selected to be tested. Each selected output port may have an output pin assigned during initialization step. An output pin of the MCU may be communicatively coupled to a corresponding SFP device coupled to a specific fibre connection which the user desires to test.

The MCU may send signals to a certain SFP device through its corresponding output pin. The SFP device may disconnect or reconnect its fibre connection based on the signal provided from the MCU. In a preferred embodiment of the present invention, the MCU may utilize the look-up table to perform the test command. At step 308, a testing output port may be determined from the look-up table. At step 310, a proper signal may be sent to a SFP device commutatively connected to a corresponding output pin of the testing output port. The proper signal may include a positive signal voltage (positive signal), a low signal voltage (reset signal), an on/off interval signal and the like. In a particular embodiment, the positive signal voltage may disconnect a fibre connection in the corresponding SFP device and the low signal voltage may reconnect a fibre connection in the corresponding SFP device. Sometimes, the user may require a test which repeats extraction/insertion of fibre cable for a certain time period. In such a case, a combination of a positive signal voltage and low signal voltage may be sent repeatedly for the certain time period.

The look-up table may be updated to indicate that a proper signal has been sent to the testing output port (coupled to the testing SFP) at step 312. At step 314, whether the test command has been completed may be determined by checking the look-up table. If the test command has been completed, the output ports and registers in the MCU may be reset at step 316. Otherwise, the method may repeat steps 308-312.

Referring now to FIG. 4, an exemplary look-up table 400 is shown. In an embodiment of the present invention, the look-up table 400 may include an entry 402-406 for the SFP device and its corresponding output pin. For example, when the user requests to select SFP2 to be tested, the MCU may find that SFP2 is located on output port pin 15 through the look-up table 400. SFP2 is physically connected to output port pin 15 of the MCU.

Referring now to FIG. 5, an illustration of a flow diagram 500 of a method of simulating a repeated extraction/insertion of a fibre cable in accordance with the present invention is shown. In a particular embodiment of the present invention, when the user desires a test requiring repeated extraction/insertion of fibre cable, the user may provide a time interval between an extraction and an insertion of the fibre cable and a time period of the test. At step 502, a time-count of the on/off signal may be determined based on the time period and the time interval provided by the user. At step 504, a positive signal voltage (on signal) may be send to the corresponding SFP device through an output port of the MCU. After a time interval, a low signal voltage (off signal) may be send to the corresponding SFP device at step 506. The time-count may be decremented to indicate that a combination of an on/off signal has been sent to the corresponding SFP device at 508. At step 510, the time-count may be determined whether it is zero. If the time-count is not zero, the method may repeat steps 504-510. Otherwise, the method may assume that the on/off interval test has been completed.

Advantageously, the FSCS system may not affect normal fibre operations due to fast switching characteristics of MOSFETs and low power requirement. As such, Fiber communication may not be disrupted between the host and the device even if the FSCS system is accidentally disconnected. The FSCS module is very small, transportable and thus mounts easily inside or outside of various SFP devices. Additionally, an embodiment of the present invention may be cost effective.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A Fibre Selective Control Switch system for testing of a fibre network environment, comprising:
    a microcontroller module suitable for being download programmable, the microcontroller controlling the Fibre Selective Control Switch system;
    a fibre selective control switch module coupled to the microcontroller module, the fibre selective control switch module comprising a first MOSFET, a second MOSFET, and a pull down resistor, a gate of the first MOSFET coupled to the microcontroller module and a gate of the second MOSFET coupled to the microcontroller module; and
    a small form pluggable device coupled to one end of a fibre cable in the fibre network wherein the small form pluggable device is configured to operate a fibre connection with the fibre network through the fibre cable, the small form pluggable device providing power for the fibre selective control switch module,
    wherein the fibre selective control switch module is mounted on the small form pluggable device, the microcontroller module is operable to send one selected from a positive signal voltage to the gate of the first MOSFET and the gate of the second MOSFET in order to simulate an extraction of the component of the fibre network by causing the small form pluggable device to disconnect the fibre connection with the fibre network through the fibre cable and a low signal voltage to the gate of the first MOSFET and the gate of the second MOSFET in order to simulate a re-insertion of the component of the fibre network by causing the small form pluggable device to re-connect the fibre connection with the fibre network through the fibre cable, the simulation of extraction and re-insertion of the component of the fibre network being suitable for the testing of the physical layer topology of the fibre network.

2. The Fibre Selective Control Switch system as described in claim 1, wherein the microcontroller module is suitable for receiving a test command from a user terminal over a network.

3. The Fibre Selective Control Switch system as described in claim 1, wherein the microcontroller module and the fibre selective control switch module are coupled through a two wire connection.

4. The Fibre Selective Control Switch system as described in claim 1, wherein the first MOSFET and the second MOSFET are P-channel MOSFETs.

5. The Fibre Selective Control Switch system as described in claim 1, further comprising:
    a plurality of fibre selective control switch modules coupled to the microcontroller module, each of the plurality of fibre selective control switch modules being mounted on an associated small form pluggable device, each associated small form pluggable device being configured to operate an associated fibre connection with the fibre network through the associated fibre cable,
    wherein each of the plurality of fibre selective control switch modules is suitable for being controlled by the microcontroller module and each being operable in response to one selected from a positive signal voltage from the microcontroller module to cause the associated small form pluggable device to simulate an extraction of the component of the fibre network by causing the small form pluggable device to disconnect the fibre connection with the fibre network through the fibre cable and a low signal voltage from the microcontroller to cause the associated small form pluggable device to simulate a re-insertion of the component of the fibre network by causing the small form pluggable device to re-connect the fibre connection with the fibre network through the fibre cable, the simulation of extraction and re-insertion of the component of the fibre network being suitable for the testing of the physical layer topology of the fibre network.

6. The Fibre Selective Control Switch system as described in claim 1, wherein the microcontroller module is located externally from the fibre network environment.

7. The Fibre Selective Control Switch system as described in claim 1, wherein the component of the fibre network comprises one selected from a fibre cable and a fibre enclosure.

8. A method for testing of a fibre network environment, comprising:
    receiving a test command from a user;
    initializing a microcontroller, the microcontroller controlling a plurality of small form pluggable devices, each one coupled to one end of a fibre cable and each one configured to operate a fibre connection with the fibre network through the fibre cable, each small form pluggable device comprising a switch module which comprises a first MOSFET, a second MOSFET, and a pull down resistor, a gate of the first MOSFET coupled to the microcontroller module and a gate of the second MOSFET coupled to the microcontroller module;

building a look-up table for the test command;

sending at least one signal from the microcontroller to at least one of the plurality of small form pluggable devices based on the look-up table, wherein the at least one signal causes the at least one of the plurality of small form pluggable devices to perform one selected from disconnecting and reconnecting the fibre connection with the fibre network through the fibre cable to simulate one selected from extraction and re-insertion of a component of the fibre network;

updating the lookup table to indicate that the at least one signal from the microcontroller to at least one of the plurality of small form pluggable devices has been sent, wherein the microcontroller updates the look-up table; and resetting the microcontroller after the performing the test command is done.

9. The method as described in claim 8, further comprising:

upon power up, holding a plurality of output ports in the microcontroller and setting a plurality of output registers low.

10. The method as described in claim 9, the initializing a microcontroller step further comprising:

assigning an output pin to each corresponding output port, wherein the output pin is communicatively coupled to a corresponding small form pluggable device.

11. The method as described in claim 10, the performing the test command step further comprising:

determining a testing output port from the look-up table;

sending a signal to a corresponding small form pluggable device of the testing output port; and updating the look-up table after the signal has been sent for the testing output port.

12. The method as described in claim 11, wherein the signal is a positive signal voltage.

13. The method as described in claim 12, wherein the positive signal voltage causes the corresponding small form pluggable device to disconnect the fibre connection with the fibre network through the fibre cable to simulate extraction of the component of the fibre network.

14. The method as described in claim 11, wherein the signal is a reset signal, wherein the reset signal is a low signal voltage.

15. The method as described in claim 14, wherein the reset signal causes the corresponding small form pluggable device to re-connect the fibre connection with the fibre network through the fibre cable to simulate re-insertion of a component of the fibre network.

16. The method as described in claim 11, wherein the signal is an on/off signal.

17. The method as described in claim 16, wherein the microcontroller sends a positive signal voltage and then a reset signal repeatedly for a time period of the on/off signal.

18. The method as described in claim 8, wherein the component of the fibre network comprises one selected from a fibre cable and a fibre enclosure.

* * * * *